US 6,625,334 B1

United States Patent
Shiota et al.

(10) Patent No.: US 6,625,334 B1
(45) Date of Patent: Sep. 23, 2003

(54) PICTURE IMAGE FILING METHOD AND DEVICE AND STORAGE MEDIUM

(75) Inventors: Kazuo Shiota, Tokyo (JP); Norihisa Haneda, Saitama-ken (JP); Shigekazu Fukada, Tokyo (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 08/956,028

(22) Filed: Oct. 22, 1997

(30) Foreign Application Priority Data

Oct. 22, 1996  (JP) .............................................. 8-279204

(51) Int. Cl.⁷ ................................................ G06K 9/54
(52) U.S. Cl. .................................... 382/305; 348/231.5
(58) Field of Search .......................... 382/305; 358/403, 358/449; 707/204, 104; 348/231, 231.99, 231.2, 231.5

(56) References Cited

U.S. PATENT DOCUMENTS

| 4,941,125 A | * | 7/1990 | Boyne ......................... 364/900 |
| 5,249,053 A | * | 9/1993 | Jain ............................ 348/231 |
| 5,329,383 A | * | 7/1994 | Collette ....................... 358/527 |
| 5,608,542 A | * | 3/1997 | Krahe et al. ................. 358/449 |
| 5,633,678 A | * | 5/1997 | Parulski et al. ................ 34/232 |
| 5,706,457 A | * | 1/1998 | Dwyer et al. |
| 5,764,870 A | * | 6/1998 | Manico et al. .............. 382/282 |
| 5,806,072 A | * | 9/1998 | Kuba et al. ................. 707/200 |
| 6,111,662 A |   | 8/2000 | Satoh et al. ................. 358/442 |

FOREIGN PATENT DOCUMENTS

| EP | 0 528 084 A | 2/1993 |
| EP | 0 561 606 A1 | 9/1993 |
| JP | 6-044318 A | 2/1994 |

* cited by examiner

Primary Examiner—Yon J. Couso
(74) Attorney, Agent, or Firm—Birch, Stewart, Kolasch & Birch, LLP

(57) ABSTRACT

When picture image data recorded by a digital camera are transferred from a memory of the digital camera to another medium, filing is carried out in a short time and easily by determining a file name with no complete overlap with another file name, which is easy to understand, and easy to search for later. A file name including recording property information included in an image file and image file identifying information for identifying the image file is automatically determined, and copying (transfer) of the file to another medium is carried out using the determined file name as the file name in the medium.

41 Claims, 3 Drawing Sheets

PICTURE IMAGE FILING METHOD AND DEVICE AND STORAGE MEDIUM

BACKGROUND OF THE INVENTION

1. Field of the Invention

The present invention relates to a method and a device for filing picture images recorded by a digital camera, and also to a storage medium which stores a program for the method. More specifically, the present invention relates to a filing method and the like used in a case where picture image data in a digital camera's memory are transferred to another medium and stored in the storage medium.

2. Description of the Related Arts

A digital camera is used to store pictures recorded thereby in a built-in memory thereof or in a memory card in the form of digital image data. When the memory is full, the digital image data stored in the memory are usually transferred to another medium and subsequent picture recording is carried out thereafter. The price of a memory (or the number of memory cards and the like) is proportional to its capacity. Therefore, it has been known that a maintenance cost of picture recording can be suppressed when picture image data are transferred frequently from only one memory card rather than occasionally from a plurality of memory cards. As a medium for storing transferred data, a hard disc of a personal computer or an image server in a laboratory can be used.

Meanwhile, in a digital camera, when picture image data having been recorded by the camera are stored in a memory, recording property information such as a theme title of the picture and the date of recording may sometimes be stored together with the picture image data in one file. For example, Fuji Photo Film Co., Ltd. has proposed an image file format which is called Exif (Exchangeable image file format) as a file format for such an occasion. The recording property information is used when the date of recording is printed at an edge of a picture upon printing of the picture in a laboratory, for example.

An image file which is stored in a memory of a digital camera as described above is stored in the memory under a file name which is distinguishable from other files, such as a name comprising a recording serial number. However, such a file name is merely a name for identifying a file in the memory, and renaming should be carried out when the file is transferred from the memory to another medium so that no file names are identical with one another within the medium.

If no identical file names is the only issue to be considered, consecutive serial numbers may be sufficient as the file names, for example. However, when an image file needs to be used after some time, a file name such as a serial number presents a problem in searching the image file, since a relationship between the content of the picture image recorded and the file name is not obvious from the file name if it is merely a serial number. Therefore, if an image server in a laboratory is used, for example, a file name such as a name showing a relationship between a customer and the date of receipt is usually used. If a hard disc of a personal computer in a general household is used, a file name showing a relationship with the picture content or the date of recording is frequently used.

However, such file management is very troublesome, not only in the cases where a digital camera is involved. Furthermore, in the case of a digital camera, a large amount of files frequently need to be transferred in a short time, which is different from document file management, for example. In other words, in a case of a laboratory where prints are created from a customer's memory card, the memory card should be returned to the customer after an immediate transfer of files. In a case such that an individual brings a notebook computer to a place where pictures are shot, and consecutively takes pictures while storing image data, a transfer of image data files to a hard disc should be carried out as soon as possible so that the person does not miss a photo taking opportunity.

Therefore, there has been desired a method for easily transferring image data of pictures recorded by a digital camera to a server in a laboratory or to a hard disc of a personal computer.

SUMMARY OF THE INVENTION

Based on consideration of the above problems, an object of the present invention is to provide a method and a device for enabling easier filing by determining a file name with no complete overlap with another file name, which is easy to understand, and easy to search for later, when image data of a picture recorded by a digital camera are transferred to another medium.

The picture image filing method of the present invention is a method for storing an image file comprising image data representing a picture image recorded by a digital camera and recording property information of the picture image by copying the file from a first storage means, such as a memory card within the digital camera in which the image file has been recorded by the recording, to a second storage medium outside the digital camera, comprising the steps of determining a file name of the image file in the second storage means containing at least a portion of the recording property information of the image file and image file identifying information for identifying the file name in the second storage means, and storing the image file by copying the image file using the determined file name as the name of the image file in the second storage means.

"The recording property information" herein referred to means, for example, a theme title of a recording, the date of recording, a recording frame number, the name of a camera, the name of a photographer, picture location information and any other information relevant to the recording. It depends on a digital camera function or a mode setting as to what kind of recording property information can be stored. In the present invention, it is assumed that at least one kind of recording property information is contained within an image file.

"A first storage means" herein referred to mainly means a built-in memory of a digital camera or a memory card, but also means a medium which cannot be incorporated in a digital camera, such as a floppy disc. In other words, although the present invention originally targets a case where recorded image data are transferred to another medium for the first time, the present invention can also be used in a case where an image data were temporarily transferred to another medium because the function of the present invention was not available at the time of this first transfer, and the image data are transferred to still another medium using the function of the present invention. "A second storage means outside the digital camera" means a server in a laboratory, a hard disc of a personal computer, or the like.

"Copying" means not only what is widely called copying but also a transfer through a cable, network, infrared communication or the like.

"Image file identifying information" means a number, a symbol, a character or the like to be determined only for identifying a file. Depending on the kind of recording property information to be used for file name determination, a plurality of image files can have identical recording property information. Therefore, the image file identifying information is used to make a file name in the second storage medium unique in such a case. It can be a serial number, for example. In this case, if the recording property information is a theme title and the date of recording, supposing that October 10 is expressed as 1010, the file name is determined such as athletic meeting 10101, athletic meeting 10102, athletic meeting 10103 . . . and so on.

Furthermore, the picture image filing device of the present invention is a device for carrying out processing according to the above filing method, and this device stores an image file comprising image data representing a picture image recorded by a digital camera and recording property information of the picture image by copying the file from a first storage means, such as a memory card within the digital camera in which the image file has been recorded by the recording, to a second storage medium outside the digital camera, comprising a file name determination means for determining a file name in the second storage means containing at least a portion of the property information of the image file and image file identifying information for identifying the file name in the second storage means, and a storage means for storing the image file by copying the image file using the determined file name as the name of the image file in the second storage means. The picture image filing device specifically means, for example, a printing system having the above function and set in a laboratory, a personal computer, a work station or the like.

The storage medium of the present invention is a storage medium provided for implementing the above filing method using a general purpose computer such as a personal computer, and stores a program for carrying out, using a computer, the filing method which stores an image file comprising image data representing a picture image recorded by a digital camera and recording property information of the image file by copying the image file from a first storage means in which the image file has been recorded by the recording to a second storage medium outside the digital camera. The program is a filing processing program characterized by that the program makes the computer determine a name of the image file in the second storage medium comprising at least one portion of the recording property information of the image file and image file identifying information for identifying the image file in the second storage means, and carry out copying and storage of the image file using the determined file name as the name of the image file in the second storage means.

The picture image filing method and device of the present invention is used to automatically determine a file name comprising recording property information included in an image file and image file identifying information for identifying the image file when a picture image recorded by a digital camera is transferred from a memory attached to the camera to another medium, and also to copy the file in the medium using the determined file name as the file name in the medium. In this manner, it is not necessary to individually determine a file name for each image file. It also becomes possible to file image files under file names which are not time consuming to determine, without complete overlap with another file name, are easy to understand, and easy to search for later, even when a transfer of image files needs to be carried out frequently.

Since the storage medium which stores the program of the present invention stores the program for carrying out the above filing method, it becomes possible to install this program into a general purpose personal computer or a work station, which makes the personal computer or the like serve as a filing device equivalent to the above filing device of the present invention.

DESCRIPTION OF THE PREFERRED EMBODIMENT

Figure 1:
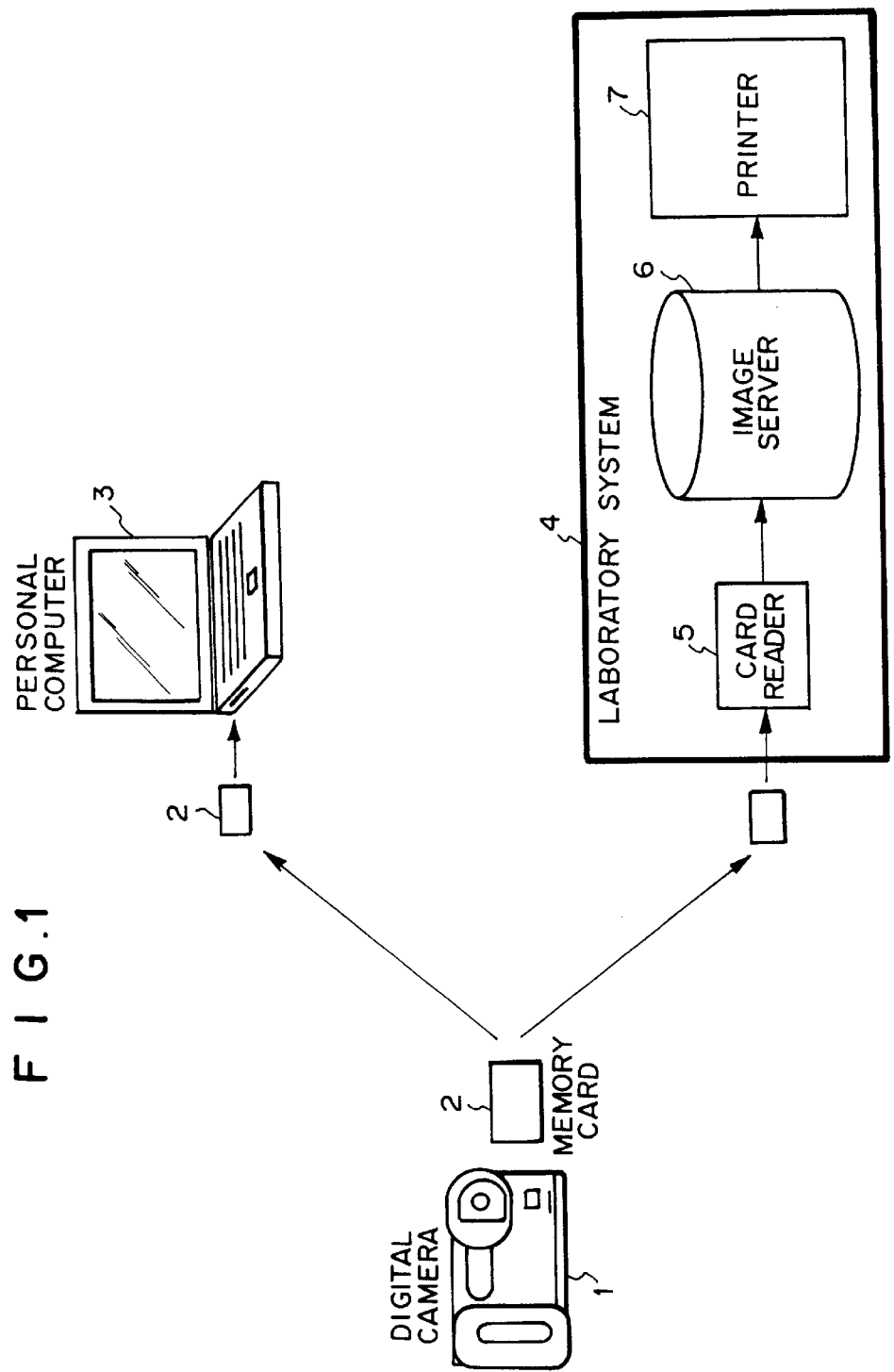
FIG. 1 is a view showing how a digital camera is used.

Hereinafter, a filing method and device of the present invention will be explained referring to the accompanying drawings. FIG. 1 is a view showing how a digital camera is generally used. A digital camera 1 may store pictures it has recorded in a built-in memory thereof, or store pictures it has recorded in a memory card 2 which is detachable. In any case, picture image data having been recorded are transferred to another medium after the end of picture shooting, and the memory is used for subsequent picture shooting.

Another form of medium herein is a hard disc of a personal computer 3, and yet another is an image server 6 in a laboratory system 4, as shown by FIG. 1. In the case where the personal computer 3 is used, data can be transferred to the hard disc via a cable connection if the digital camera 1 uses the built-in memory, or by slotting the memory card 2 into a card slot of the personal computer directly or via an adapter or the like, if the digital camera 1 uses the memory card 2.

In the case where the laboratory system 4 is used, an inputting means such as a card reader 5 or a cable interface is provided, and image data can be transferred to the image server 6 by such means. In this case, the image data can be output in the form of a picture print by a printer 7 in the same manner as is used for a camera using a film.

Alternatively, if a digital camera is attached to a personal digital assistant (PDA) which has a communication function, or if a digital camera itself has a communication function, it is possible, using the communication function, to transfer image data through a network or a telephone line.

The filing method and device of the present invention is related to translocation (copy, transfer and the like) of image files from such a digital camera to another medium. More specifically, the filing method and device is implemented as software incorporated in a personal computer or an image server. If a personal computer is used, a storage medium which stores the program of the present invention is provided to a user so that incorporation of this function can be implemented by installing the program having been stored in the medium into the personal computer.

The above filing function assumes that image data obtained by a digital camera and recording property information representing a variety of information relevant to recording are stored together as a set in an image file in a memory. Therefore, when this filing function is used, recording property information storing mode of a digital camera is meant to be set to an automatic recording mode. Information regarding recording such as a theme title, the date of recording, the name of a photographer, a picture location, and the name of a camera, as well as information regarding later processing such as whether or not the image data should be printed or stored may be included in the recording property information. By including such information in the recording property information, the information may be referred to so that only necessary information will be translocated upon translocation of the image file.

Figure 2:
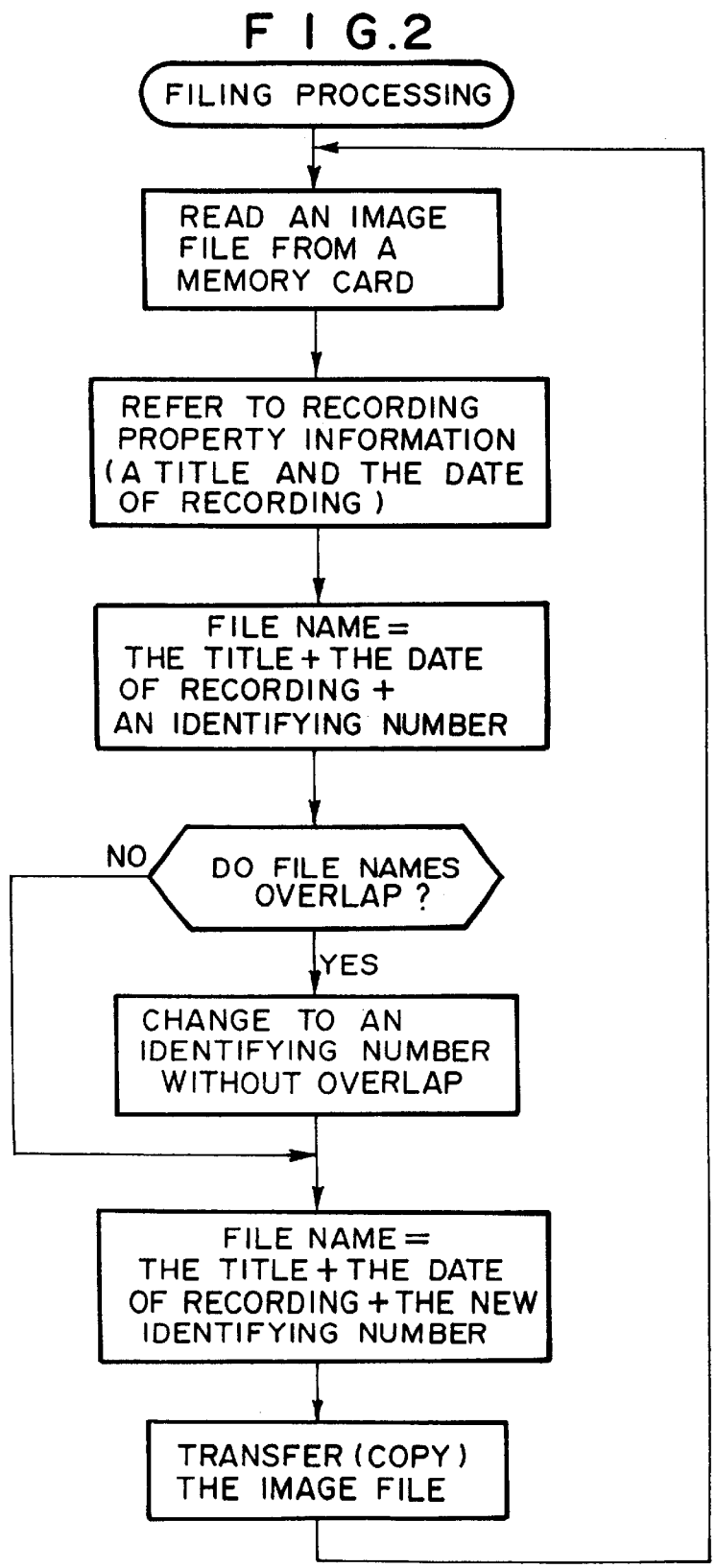
FIG. 2 is a flow chart showing an example of processing in the filing method in accordance with the present invention.
Figure 3:
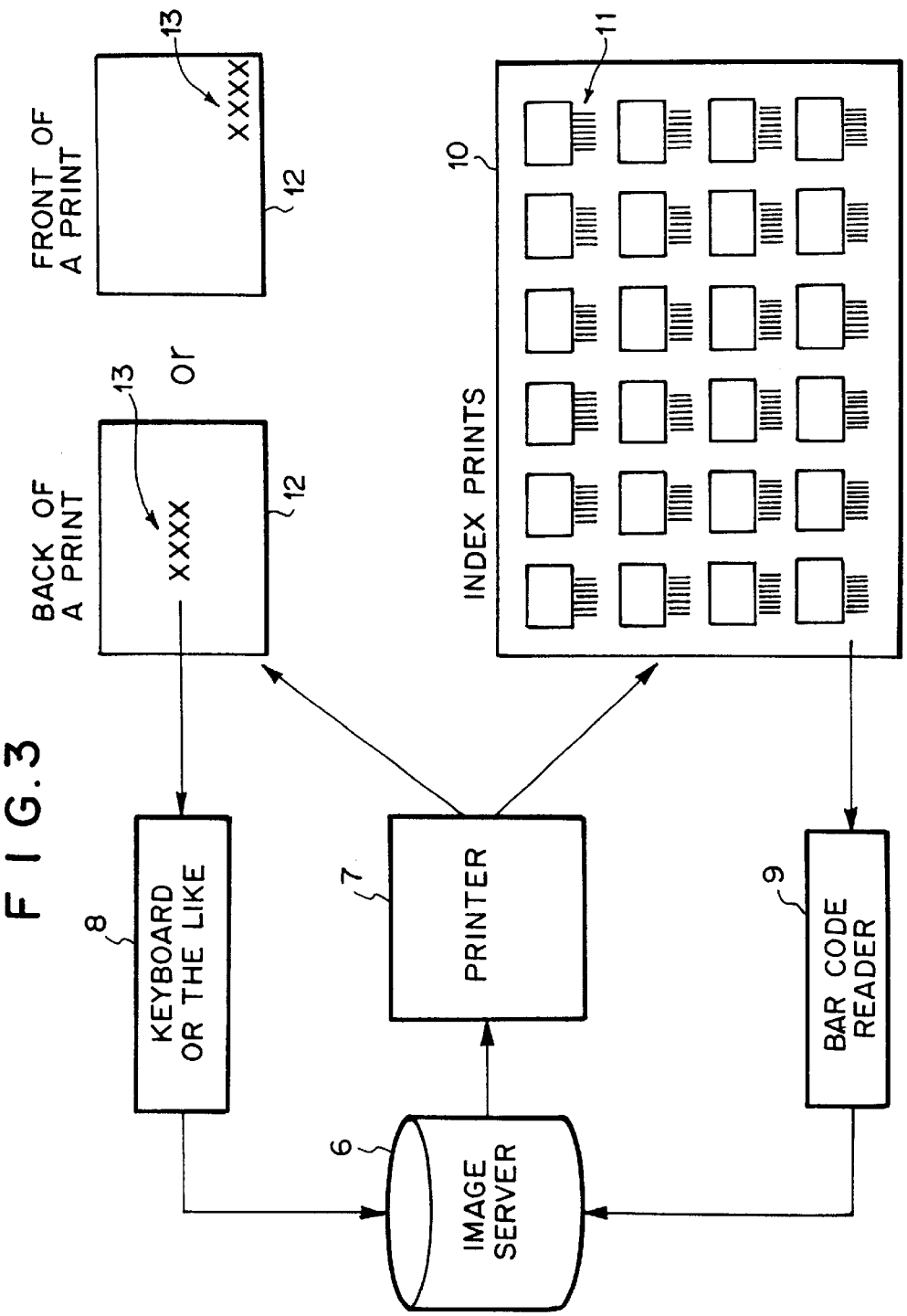
FIG. 3 is a view showing how an image file name determined by the present invention is used in a laboratory system.

FIG. 2 shows an example of filing processing to be implemented by the above software. The processing in FIG. 2 shows an example of the processing carried out when the filing program is run by a personal computer. When a memory card is set into a card slot and the processing is started, image files within the memory card are read one by one in the order of recording, and recording property information contained in the image file is referred to. In the example shown by FIG. 2, among the recording property information, a theme title of recording and the date of recording are referred to. Based on the information, a file name used upon storage of the image file is determined. In this example, the file name is determined by a combination of the title, the date of recording, and an identifying number. For example, if the title of the recording property information is "a flower", and the date of recording is April 3 (which is assumed to be expressed as 0403), the file name may be expressed as "flower0403001", when the identifying information is assumed to be "001".

The identifying number 001 in the above example is to identify the image file in the hard disc of the personal computer. If a file name is determined by using only the recording property information, a plurality of image files may have an identical file name, since the recording property information of the image files is the same. By using the identifying number, a complete file name overlap can be avoided. In this case, the identifying number can be automatically assigned by using the numbers representing the order of recording in the digital camera (the frame numbers) such that the first read image file has 001 and the following files are sequentially assigned to 002, 003 thereafter.

However, if this processing is carried out on another memory card, and an image file of a picture with identical recording property information (a picture recorded on the same day with the same theme title, flower) is to be translocated, the files with the same recording order would have completely overlapping file names. Therefore, in the example in FIG. 2, it is examined, after a file name is temporarily determined, whether or not an image file with the identical file name already exists in the hard disc. When no complete file name overlap is found, the image file is stored under the file name having been determined temporarily. If an image file with the identical file name already exists, a new file name is determined by changing the identifying number.

In this case, for determining the new identifying number, a file name search and comparison processing is repeated for a plurality of times. As a result, if 10 image files with identifying numbers 001 to 010 already exist, a following image file is stored in the hard disc under a file name "flower0403011", with 011 being the identifying number. Alternatively, by storing the fact that identifying numbers 001 through 010 have already been used for a combination of recording property information "flower0403" and referring to this fact, the processing may be started with the identifying number starting from 011 the next time.

By carrying out the processing described above, a file name is automatically determined without naming of the file by a user, and an image file is transferred to and stored in a hard disc. However, the processing shown in FIG. 2 is merely an example, and all image files within the memory card may be processed at one time. Alternatively, the recording property information used for determination of the file names may be other items, and the number of the items is not specifically limited.

When the present invention is carried out by a system in a laboratory rather than a personal computer, a printing system, for example, can be made to comprise a counter for counting a reception number. Every time one memory card is accepted, the counter is incremented and the identifying number is assigned by a combination of the reception number and a serial number. In this manner, identifying numbers with no complete overlap can be assigned automatically without performing the overlap examination for each memory card. In other words, if the identifying number is expressed with a 7-digit number comprising a 4-digit reception number and a 3-digit serial number for example, and 10 image files "flower04030001001" through "flower04030001010" have been translocated from a first memory card, file names for the next memory card are determined such as "flower04030002001" through "flower04030002010". In this case, it is not necessary to examine the names of the files having already been stored one by one, and faster processing than in the example in FIG. 2 becomes possible, since the time for the overlap examination is saved.

When the image file having been stored as described above is output as a print in a laboratory, the file name or characters and symbols (character code 13) corresponding to the file name may be printed on the front or back of a print 12, or under each frame of an index print 10. Alternatively, a bar code 11 may be printed thereon instead of the character code 13.

In this manner, it becomes possible that, when a customer orders an extra print by specifying the frame to be copied using the index prints 10, a clerk only reads the bar code 11 of the frame using a bar code reader 9 and the system recognizes the image file name for the frame, searches the file, and immediately outputs the file as an extra print. If the file name is printed as the character code 13, an extra print is obtained likewise when the code is input from a keyboard 8 or the like.

As described above, according to the present invention, an image file can be filed without the naming of each image file by a user upon translocation of the image file, without consuming time unnecessarily in a case where frequent translocations of image files are necessary, and using a file name with no complete overlap with another file name, which is easy to understand, and easy to search for later. Moreover, by recording this file name on a print, an image file search upon extra print order can be carried out promptly.

What is claimed is:

1. A picture image filing method wherein an image file including image data, representing a picture image recorded by a digital camera, and recording property information of the picture image is copied from first storage, in which the image file has been stored by recording, to second storage outside the digital camera and stored in the second storage, comprising the steps of:

automatically determining a file name in the second storage including at least a portion of the recording property information of the image file and image file identifying information for identifying the image file in the second storage, and storing the image file by copying the image file using the file name having been determined as the name of the image file in the second storage.

2. A picture image filing device by which an image file including image data, representing a picture image recorded by a digital camera, and recording property information of the picture image is copied from a first storage, in which the image file has been stored by recording, to a second storage outside the digital camera and stored in the second storage, comprising:

file name determination means for automatically determining a file name in the second storage including at least a portion of the recording property information of the image file and image file identifying information for identifying the image file in the second storage, and image file storage for storing the image file by carrying out the copying of the image file using the file name having been determined as the name of the image file in the second storage.

3. A storage medium which stores a program by which a computer performs a filing processing for storing an image file including image data, representing a picture image recorded by a digital camera, and recording property information of the picture image from first storage, in which the image file has been stored by recording, to second storage outside the digital camera by copying the image file, the processing comprising the steps of:

automatically determining a file name in the second storage including at least a portion of the recording property information of the image file and image file identifying information for identifying the image file in the second storage, and carrying out copying and storage of the file using the file name having been determined as the file name of the image file in the second storage.

4. A method of storing an image file including image data, representing a picture image recorded by a digital camera, and recording property information of the picture image copied from a first memory to a second memory outside the digital camera, comprising:

automatically determining a file name from a portion of the recording property information of the image file and image file identifying information, and storing the image file under the file name in the second memory.

5. The method of claim 4, wherein the recording property information includes at least one of a theme title, a recording date, a recording frame number, a camera name, a photographer name, and picture location information.

6. The method of claim 4, wherein the first memory is a memory built in to the digital camera.

7. The method of claim 4, wherein the first memory is a floppy disk.

8. The method of claim 4, wherein the image file identifying information includes at least one of an identifying number, symbol, or character which makes the filename in the second memory unique.

9. The method of claim 4, wherein the image identifying information includes a bar code.

10. The method of claim 9, wherein the bar code corresponds to a file name and is used to order an extra print.

11. The method of claim 8, wherein the recording property information includes the theme title and the recording date and the image file identifying information includes a sequentially assigned number.

12. The method of claim 4, further comprising:
repeating the determining step and the storing step for a plurality of picture images, wherein the file identifying information includes sequentially assigned information.

13. The method of claim 4, wherein the file name is obtained without user intervention.

14. The method of claim 4, wherein the image file identifying information includes reception information and signal information.

15. A device for storing an image file including image data, representing a picture image recorded by a digital camera, and recording property information of the picture image copied from a first memory to a second memory outside the digital camera, comprising:

a file name determining unit for automatically determining a file name from at least a portion of the recording property information of the image file and image file identifying information, and a storing unit for storing the image file under the file name in the second memory.

16. The device of claim 15, wherein the recording property information includes at least one of a theme title, a recording date, a recording frame number, a camera name, a photographer name, and picture location information.

17. The device of claim 15, wherein the first memory is a memory built in to the digital camera.

18. The device of claim 15, wherein the first memory is a floppy disk.

19. The device of claim 15, wherein the image file identifying information includes at least one of an identifying number, symbol, or character which makes the file name in the second memory unique.

20. The device of claim 15, wherein the image identifying information includes a bar code.

21. The device of claim 20, wherein the bar code corresponds to a file name and is used to order an extra print.

22. The device of claim 19, wherein the recording property information includes the theme title and the recording date and the image file identifying information includes a sequentially assigned number.

23. The device of claim 15, further comprising:
repeating the determining step and the storing step for a plurality of picture images, wherein the file identifying information includes sequentially assigned information.

24. The device of claim 15, wherein the file name is obtained without user intervention.

25. The device of claim 15, wherein the image file identifying information includes reception information and signal information.

26. The device of claim 15, wherein said device is a personal computer.

27. The device of claim 15, wherein said device is an image server of a laboratory system.

28. A computer program embodied on a computer-readable medium for storing an image file including image data, representing a picture image recorded by a digital camera, and recording property information of the picture image copied from a first memory to a second memory outside the digital camera, comprising:

a file name determining source code segment for automatically determining a file name from at least a portion of the recording property information of the image file and image file identifying information, and a storing source code segment for storing the image file under the file name in the second memory.

29. The computer program of claim 28, wherein the recording property information includes at least one of a theme title, a recording date, a recording frame number, a camera name, a photographer name, and picture location information.

30. The computer program of claim 28, wherein the first memory is a memory built in to the digital camera.

31. The computer program of claim 28, wherein the first memory is a floppy disk.

32. The computer program of claim 28, wherein the image file identifying information includes at least one of an identifying number, symbol, or character which makes the file name in the second memory unique.

33. The computer program of claim 28, wherein the image identifying information includes a bar code.

34. The computer program of claim 33, wherein the bar code corresponds to a file name and is used to order an extra print.

35. The computer program of claim 32, wherein the recording property information includes the theme title and the recording date and the image file identifying information includes a sequentially assigned number.

36. The computer program of claim 28, further comprising:

repeating the determining step and the storing step for a plurality of picture images, wherein the file identifying information includes sequentially assigned information.

37. The computer program of claim 28, wherein the file name is obtained without user intervention.

38. The computer program of claim 28, wherein the image file identifying information includes reception information and signal information.

39. The method of claim 4, wherein said at least a portion of the recording property information included in said file name is unaltered.

40. The device of claim 15, wherein said at least a portion of the recording property information included in said file name is unaltered.

41. The computer program of claim 28, wherein said at least a portion of the recording property information is unaltered.

* * * * *